US010115039B2

(12) United States Patent
Gulsun et al.

(10) Patent No.: US 10,115,039 B2
(45) Date of Patent: Oct. 30, 2018

(54) METHOD AND SYSTEM FOR MACHINE LEARNING BASED CLASSIFICATION OF VASCULAR BRANCHES

(71) Applicant: Siemens Healthcare GmbH, Erlangen (DE)

(72) Inventors: Mehmet Akif Gulsun, Lawrenceville, NJ (US); Yefeng Zheng, Princeton Junction, NJ (US); Gareth Funka-Lea, Cranbury, NJ (US); Mingqing Chen, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/446,252

(22) Filed: Mar. 1, 2017

(65) Prior Publication Data

US 2017/0262733 A1    Sep. 14, 2017

Related U.S. Application Data

(60) Provisional application No. 62/306,474, filed on Mar. 10, 2016.

(51) Int. Cl.
*G06K 9/62* (2006.01)
*G06K 9/46* (2006.01)

(52) U.S. Cl.
CPC ......... *G06K 9/6277* (2013.01); *G06K 9/4628* (2013.01); *G06K 2209/05* (2013.01)

(58) Field of Classification Search
CPC ...... G06K 2209/05; G06K 9/34; G06K 9/627; G06K 9/6277

USPC .......................................................... 382/128
See application file for complete search history.

(56) References Cited

U.S. PATENT DOCUMENTS

| | | | |
|---|---|---|---|
| 7,916,919 B2 | 3/2011 | Zheng et al. |
| 7,953,266 B2 | 5/2011 | Gulsun et al. |
| 7,990,379 B2 | 8/2011 | Aharon et al. |
| 7,993,274 B2 | 8/2011 | Pruvot et al. |
| 8,488,852 B2 | 7/2013 | Gupta et al. |
| 8,582,854 B2 | 11/2013 | Zhang et al. |
| 8,675,943 B2 | 3/2014 | Zheng et al. |
| 9,129,417 B2 | 9/2015 | Zheng et al. |

(Continued)

*Primary Examiner* — Manuchehr Rahmjoo

(57) ABSTRACT

A method and apparatus for learning based classification of vascular branches to distinguish falsely detected branches from true branches is disclosed. A plurality of overlapping fixed size branch segments are sampled from branches of a detected centerline tree of a target vessel extracted from a medical image of a patient. A plurality of 1D profiles are extracted along each of the overlapping fixed size branch segments. A probability score for each of the overlapping fixed size branch segments is calculated based on the plurality of 1D profiles extracted for each branch segment using a trained deep neural network classifier. The trained deep neural network classifier may be a convolutional neural network (CNN) trained to predict a probability of a branch segment being fully part of a target vessel based on multi-channel 1D input. A final probability score is assigned to each centerline point in the branches of the detected centerline tree based on the probability scores of the overlapping branch segments containing that centerline point. The branches of the detected centerline tree of the target vessel are pruned based on the final probability scores of the centerline points.

32 Claims, 7 Drawing Sheets

(56) References Cited

U.S. PATENT DOCUMENTS

| | | |
|---|---|---|
| 2006/0050941 A1 | 3/2006 | Middleton et al. |
| 2008/0247622 A1* | 10/2008 | Aylward ................ A61B 90/36 382/131 |
| 2010/0076296 A1* | 3/2010 | Mittal ................... G06T 7/0012 600/408 |
| 2010/0239148 A1 | 9/2010 | Zheng et al. |
| 2013/0216110 A1 | 8/2013 | Zheng et al. |
| 2015/0235360 A1 | 8/2015 | Zheng et al. |

* cited by examiner

METHOD AND SYSTEM FOR MACHINE LEARNING BASED CLASSIFICATION OF VASCULAR BRANCHES

This application claims the benefit of U.S. Provisional Application No. 62/306,474, filed Mar. 10, 2016, the disclosure of which is herein incorporated by reference.

BACKGROUND OF THE INVENTION

The present invention relates to machine learning based classification of vascular branches in medical images, and more particularly, to machine learning based classification of vascular branches for automated extraction and pruning of vascular centerlines in medical images.

Automatic segmentation of coronary arteries in Computed Tomography Angiography (CTA) facilitates the diagnosis, treatment, and monitoring of coronary artery diseases. An important step in coronary artery segmentation is to extract a curve along the center of the coronary artery referred to as a centerline. A centerline representation is important for the visualization of the artery through a curved planar reformatting. A centerline is also useful to support lumen segmentation methods for quantitative assessments, such as stenosis grading or CT based Fractional Flow Reserve (FFR) measurements. Methods have been proposed to extract coronary artery centerlines with very high sensitivity, but at the expense of detecting false branches that commonly leak into nearby structures, such as heart tissues, veins, or other bright structures in CTA images. Interactive editing tools are available for manually removing false centerlines from detections, but manually removing false centerlines using such interactive editing tools is often time consuming. Accordingly, automated post-processing tools to correct detected centerlines for accurate visualization and quantification purposes are desirable.

BRIEF SUMMARY OF THE INVENTION

The present invention provides a method and system for machine learning based classification of vascular branches to distinguish falsely detected branches from true branches. Embodiments of the present invention utilize deep learning to learn a branch classifier using multi-channel one-dimensional (1D) input sampled along a vessel branch. Embodiments of the present invention can be utilized to enhance detection of coronary artery centerlines in computed tomography angiography (CTA) images.

In one embodiment of the present invention, a plurality of overlapping fixed size branch segments are sampled from one or more branches of a detected centerline tree of a target vessel extracted from a medical image of a patient. A plurality of 1D profiles are extracted along each of the plurality of overlapping fixed size branch segments. A probability score is calculated for each of the plurality of overlapping fixed size branch segments based on the plurality of 1D profiles using a trained deep neural network classifier. A final probability score is assigned to each of a plurality of centerline points in the one or more branches of the detected centerline tree of the target vessel based on the probability scores of the overlapping fixed size branch segments containing that centerline point. The one or more branches of the detected centerline tree of the target vessel are pruned based on the final probability scores of the plurality of centerline points in the one or more branches of the detected centerline tree of the target vessel.

These and other advantages of the invention will be apparent to those of ordinary skill in the art by reference to the following detailed description and the accompanying drawings.

DETAILED DESCRIPTION

The present invention relates to a method and system for machine learning based classification of vascular branches to distinguish falsely detected branches from true branches. Embodiments of the present invention are described herein to give a visual understanding of the machine learning based method for classification of vascular branches. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
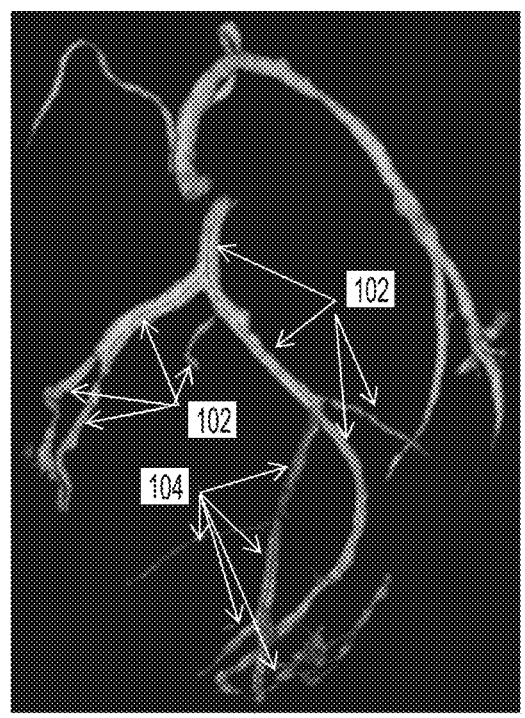
FIG. 1 illustrates an example of detected coronary artery centerlines including false branches.

Various methods have been proposed to extract vascular centerlines, such as coronary artery centerlines. Some methods are capable of extracting vascular centerlines with very high sensitivity, but at the expense of detecting false branches that often leak into nearby structures such as heart tissues, veins, or other bright structures in medical image, such as computed tomography angiography (CTA) images. FIG. 1 illustrates an example of detected coronary artery centerlines including false branches. FIG. 1 shows a 3D visualization of detected left coronary artery centerlines from a CTA image overlaid on a vesselness mask. The detected centerlines include centerlines 102 that overlap with ground truth centerlines and false branches 104 detected in the CTA image.

Figure 2:
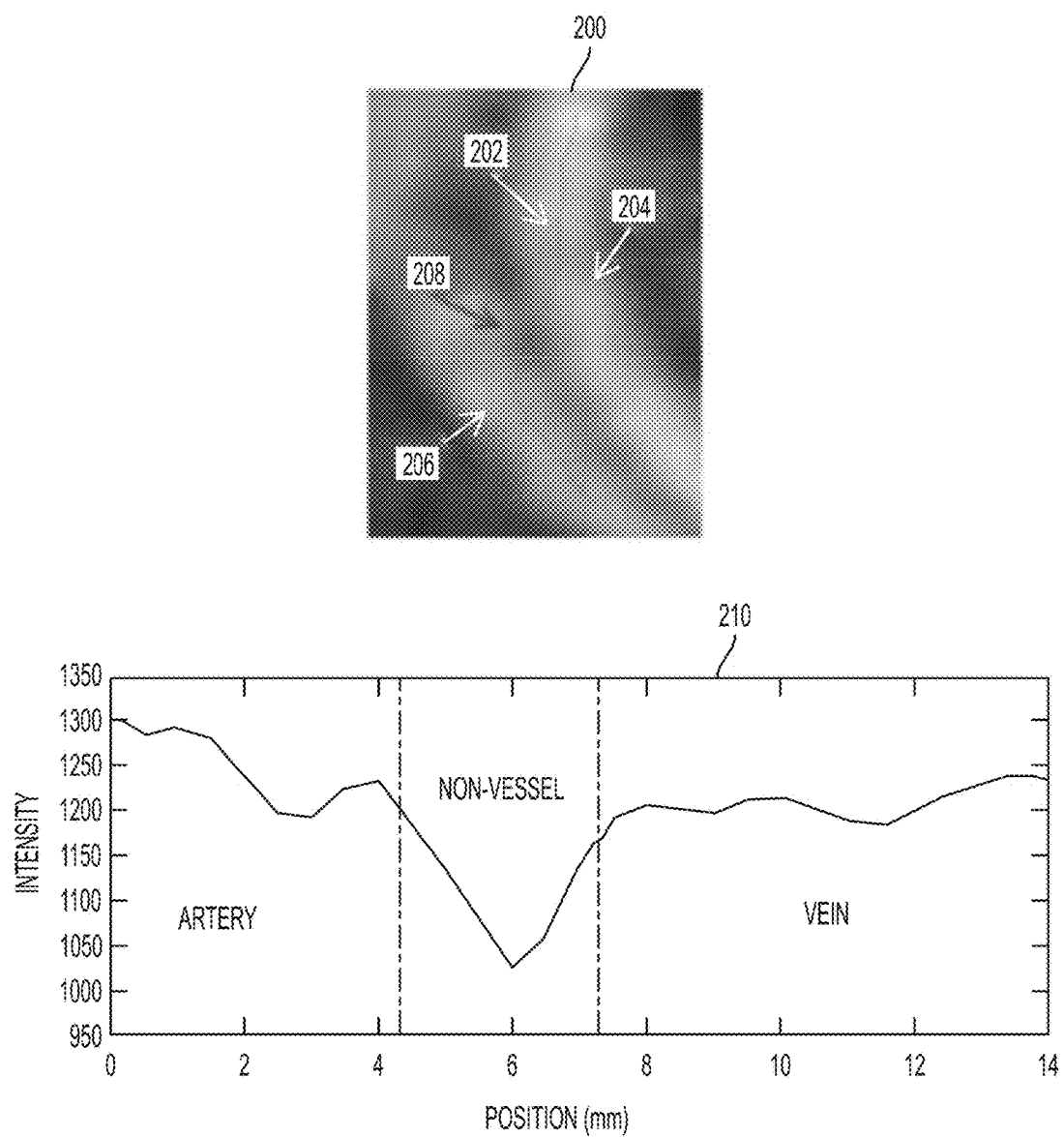
FIG. 2 illustrates an example of a detected centerline of a coronary artery leaking into an adjacent vein.

Techniques for vascular segmentation use classification based methods to compute the likelihood of detected branches. Such methods utilize support vector machines, probabilistic boosting trees, or random forest classifiers with a set of hand-crafted features such as local intensity, gradient, vessel scale, or tubularity measure statistics and histograms computed along the branch. However, vessels have thin, longitudinal, and curvy geometry, and it is likely when a detected artery branch makes a jump to nearby vessels, such as adjacent veins, only a small section of the branch will go through a non-vessel region. FIG. 2 illustrates an example of a detected centerline of a coronary artery leaking into an adjacent vein. Image 200 of FIG. 2 shows a curved multi-planar reconstruction (MPR) visualization of a detected centerline 202 of a coronary artery 204 leaking from the coronary artery 204 into an adjacent vein 206. The detected centerline 202 passes through a small non-vessel region 208 between the coronary artery 204 and the vein 206. Image 210 shows an intensity signal along the detected branch segment. As shown in image 210, the intensity signal drops in the non-vessel regions, but the intensity is similar in the coronary artery 204 and in the vein 206. Accordingly, statistical or histogram features may not accurately capture the small non-vessel sections, and at the same time are sensitive to the length of the branches. In addition, the location of a false section along the branch may vary depending on how the branch is sampled. Therefore, it is difficult to design hand-crafted features to train reliable branch classifiers.

Embodiments of the present invention utilize deep learning to learn a branch classifier using multi-channel one-dimensional (1D) input sampled along a vessel branch. In an advantageous embodiment a convolutional neural network (CNN) is used to learn the branch classifier. The CNN input channels include a plurality of 1D profiles sampled along the vessel branch, such as vessel scale, image intensity, centerline curvature, tubularity measure, intensity and gradient statistics (mean, standard deviation) along and inside cross-sectional circular boundary, and distance to a most proximal point in the branch. Rather than extracting hand-crafted features from these 1D profiles, the profiles are fed directly into the CNN classifier in order for the CNN to learn the best discriminative features from the profiles. The use of a deep learning classifier, such as a CNN, to solve the branch classification problem in embodiments of the present invention provides many benefits over previous computer based vessel classification techniques. Since the CNN can learn global features from local features inside sub-regions, embodiments of the present invention can capture small non-vessel regions along a detected branch, which is difficult to achieve with statistical or histogram based features. Because of the translation invariant property of CNNs, by means of weight sharing and pooling layers, embodiments of the present invention are robust to the location of a false section along the branch. In addition, the use of the multi-channel 1D input makes the training technique used in embodiments of the present invention less prone to overfitting.

Figure 3:
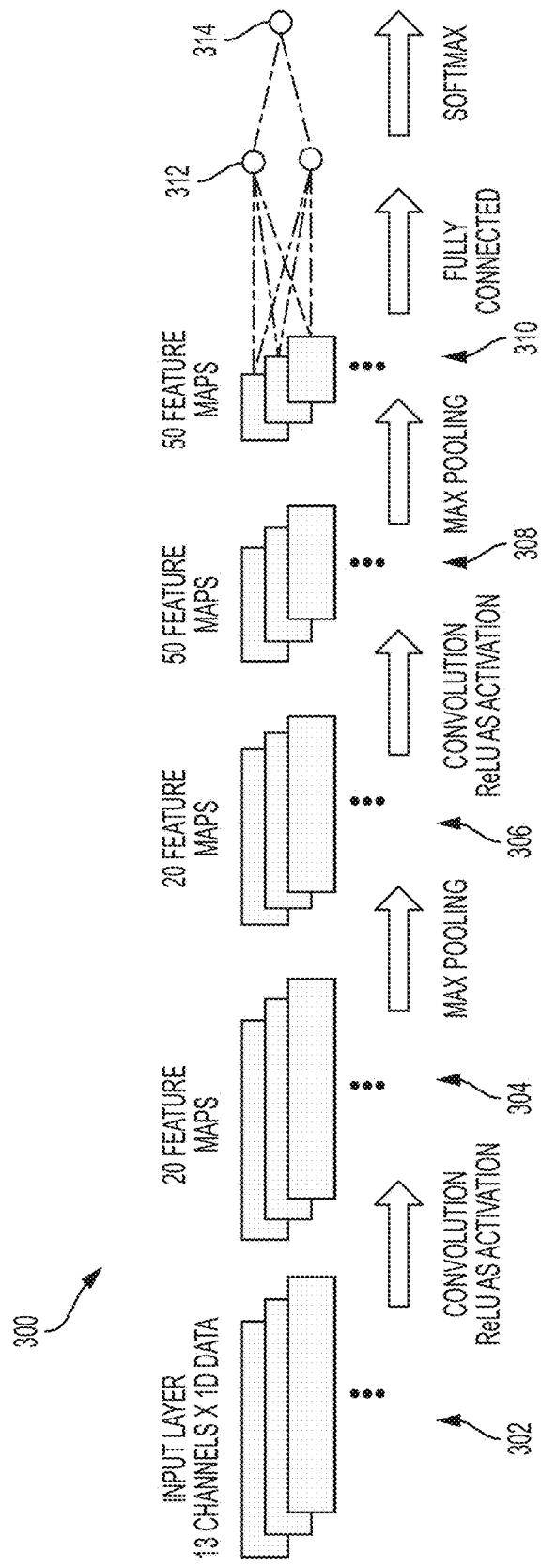
FIG. 3 illustrates an exemplary structure of a convolutional neural network (CNN) for classification of vascular branches according to an embodiment of the present invention.

FIG. 3 illustrates an exemplary structure of a CNN for classification of vascular branches according to an embodiment of the present invention. As shown in FIG. 3, the CNN 300 includes an input layer 302, five hidden layers 304, 306, 308, 310, and 312, and an output layer 314. The input layer 302 inputs 13 channels of 1D data sampled along a branch segment. In an exemplary implementation, the following 13 values are calculated at each sampling point along the branch, resulting 13 1D profiles that are input to the CNN: vessel scale, image intensity, centerline curvature, tubularity measure, intensity mean along cross-sectional circular boundary, intensity standard deviation along cross-sectional circular boundary, intensity mean inside cross-section circular boundary, intensity standard deviation inside cross-section circular boundary, gradient mean along cross-sectional circular boundary, gradient standard deviation along cross-sectional circular boundary, gradient mean inside cross-section circular boundary, gradient standard deviation inside cross-section circular boundary, and distance to the most proximal point in the branch. The input layer 302 is followed by a convolution layer 304 which uses a rectified linear unit (ReLU) activation function, followed by a max pooling layer 306, followed by another convolution layer 308 with a ReLU activation function, another max pooling layer 310, a fully connected layer 312, and the output layer 314 that applies a softmax function to fully connected layer 312 to compute a probability score for the branch segment. In the CNN 300 of FIG. 3, layers 304 and 306 each generate 20 feature maps and layers 308 and 310 each generate 50 feature maps, but the present invention is not limited thereto. The fully connected layer 312 includes a respective node for each possible class to which the branch segment can be classified.

The CNN assigns probabilistic scores to overlapping fixed length branch segments sampled along a vessel centerline from ostia to distal endpoints. The CNN classifier is trained to assign high probability scores to branch segments that fully overlap with the target vessels (e.g., coronary arteries) and low probability scores to branch segments that are fully or partially not part of the target vessels. The CNN can be trained using a gradient descent backpropagation technique based on annotated training datasets. For example, for coronary artery classification, the CNN can be trained based on expert annotated computer tomography angiography (CTA) datasets with the whole left coronary artery (LCA) and right coronary artery (RCA) centerline trees. Each centerline tree includes densely sampled centerline points with a rough estimate of a corresponding cross-sectional vessel radius at each centerline point. Overlapping fixed length branch segments are sampled along each centerline tree and multiple 1D profiles are computed for each branch segment. To train the classifier classes are assigned to the branch segments based on the overlap between the annotations and centerlines detected using an automated centerline detection algorithm, and gradient descent propagation can be used to learn weights for the layers of the CNN to best classify the branch segments in the trained dataset based on the multi-channel 1D inputs for the branch segments.

Figure 4:
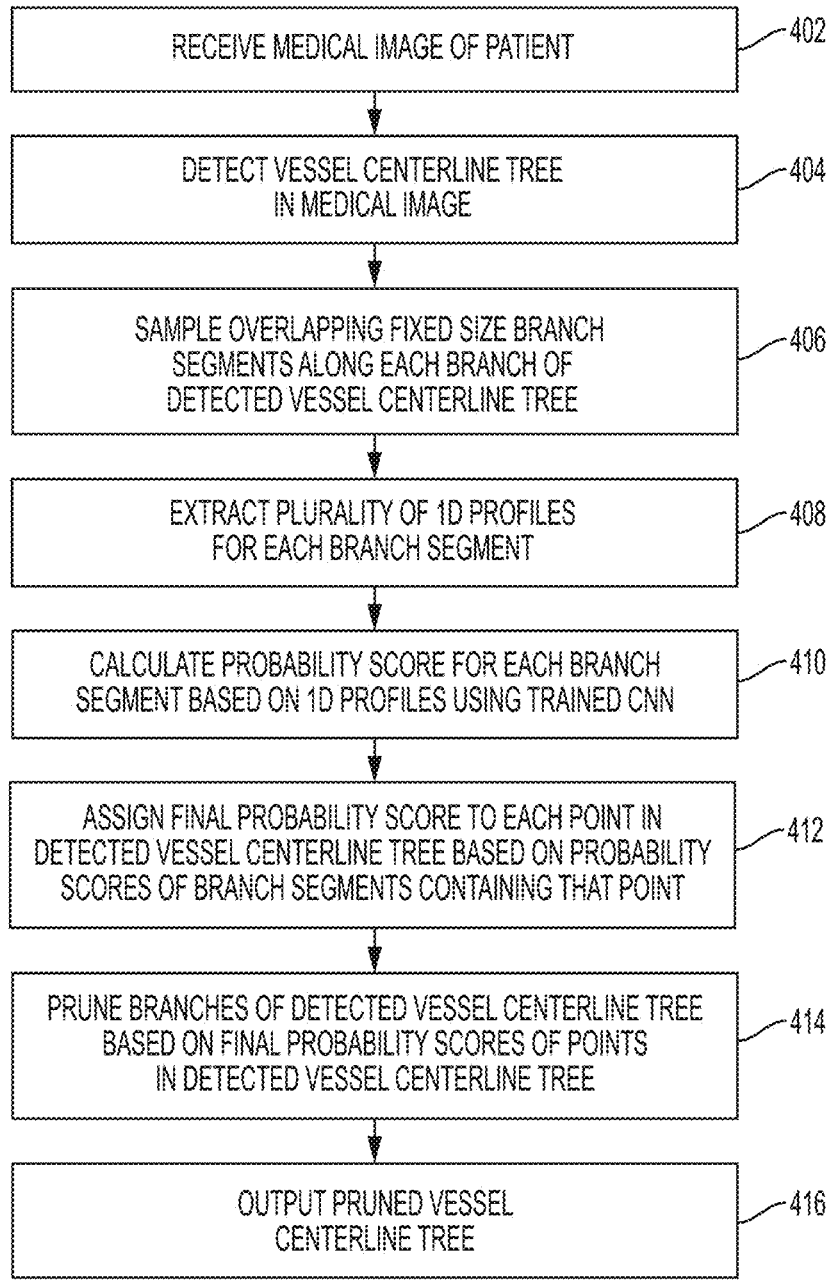
FIG. 4 illustrates a method for machine learning based classification of vascular branches to distinguish falsely detected branches from true branches according to an embodiment of the present invention.

FIG. 4 illustrates a method for machine learning based classification of vascular branches to distinguish falsely detected branches from true branches according to an embodiment of the present invention. The method of FIG. 4 uses a deep learning classifier, such as the CNN of FIG. 3 to classify branch segments of a detected centerline tree of a target vessel in order to prune falsely detected branches from the detected centerline tree. Referring to FIG. 4, at step 402, a medical image of a patient is received. In an advantageous embodiment, the medical image is a computed tomography angiography (CTA) image, but the present invention is not limited thereto and the method of FIG. 4 can be applied to other imaging modalities as well. The medical image (e.g., CTA image) includes at least one vessel of interest (e.g., coronary artery, renal artery, cerebral artery, etc.) of the patient. The medical image can be received directly from an image acquisition device, such as a CT scanner, or can be received by loading a previously stored medical image or receiving an electronic transmission of the medical image from a remote computer system.

At step 404, a centerline tree of vessel of interest is automatically detected in the medical image. The centerline tree of the vessel is automatically detected in the medical image using an automated centerline detection method. The vessel centerline tree can be detected in the medical image using a centerline tracing method or a machine learning based centerline detection method. For example, the vessel centerline tree can be detected in the medical image using a combined model-driven and data-driven method, as described in U.S. Pat. No. 9,129,417, entitled "Method and System for Coronary Artery Centerline Extraction", which is incorporated herein by reference in its entirety. Alternatively, the vessel centerline tree can be detected in the medical image using the method described in U.S. Pat. No. 7,953,266, entitled "Robust Vessel Tree Modeling", which is incorporated herein by reference in its entirety. Other automatic or semi-automatic techniques for extracting vessel centerlines may be used as well. In a possible embodiment, the vessel centerline tree of the vessel of interest can be detected in the medical image using a method of in which the vessel centerline is extracted by finding optimal flow paths in computational flow fields. The centerline tree can be represented by a set of densely sampled centerline points. In addition to the vessel centerline tree, cross-section contours can be generated at each centerline point of the centerline tree. The cross-section contour at each centerline point gives an estimate of a roughly circular cross-sectional boundary of the vessel/lumen at each centerline point.

At step 406, overlapping fixed size branch segments are sampled along each branch of the detected centerline tree. Each fixed size branch segment includes a plurality of centerline points, and the fixed size branch segments overlap such that a number of the centerline points in each fixed sized branch segment are also included in an adjacent fixed sized branch segment. For example, a new branch segment can be sampled at starting at each centerline point along each branch of the detected centerline tree or starting at every other centerline point along the each branch of the detected centerline tree. In an exemplary implementation, the fixed length of the branch segments is 10 mm with 9 mm overlap between the branch segments. In this exemplary implementation, the centerline points are sampled every 0.5 mm along the centerline, therefore, a new branch segment is sampled starting at every other centerline point.

At step 408, a plurality of 1D profiles are extracted for each branch segment. The plurality of 1D profiles are measurements or features sampled along each branch segment. 1D profiles of vessel scale, image intensity, centerline curvature, tubularity measure, intensity and gradient statistics (mean, standard deviation) along and inside cross-sectional circular boundary, and distance to a most proximal point in the branch can be extracted for each fixed length overlapping branch segment. For a given branch segment, each 1D profile is extracted by computing a value of the measurement or feature at each centerline point along the branch segment, resulting in a 1D vector of values. Accordingly, each 1D profile is a vector of values and each entry in the vector is a value of a particular measurement or feature at a respective point along the branch segment. In an advantageous implementation, the following values can be calculated at each point along each fixed length branch segment, resulting in 13 1D profiles being extracted for each branch segment:

1) Vessel scale—the size (e.g., diameter or radius) of the vessel each centerline point of the branch segment. The vessel scale can be provided by the algorithm which produces the centerlines or can be automatically estimated at each centerline point using other another algorithm;
2) Image intensity—the intensity of medical image at each centerline point of the branch segment;
3) Centerline curvature—measurement of the curvature of the centerline at each centerline point of the branch segment. The measurement of the curvature at each centerline point can be calculated using a well-known measurement for computing the curvature of a smooth curve. Curvature is calculates as $\|dT/ds\|$ where dT/ds is the derivative of unit tangent vectors with respect to the distance between points. Since the centerlines contain discrete points, the unit tangent vectors can be computed by convolving with Gaussian First Derivative.
4) Tubularity measure—measurement of tubularity at each centerline point of the branch segment, for example using a Hessian based vesselness measure, a flux based medialness measure, or other well known tubularity measures;
5) Intensity mean along cross-section circular boundary—for each centerline point of the branch segment, the mean of the intensities of points on the boundary of the cross-section contour generated at that centerline point;
6) Intensity standard deviation along cross-section circular boundary—for each centerline point of the branch segment, the standard deviation of the intensities of points on the boundary of the cross-section contour generated at that centerline point;
7) Intensity mean inside cross-section circular boundary—for each centerline point of the branch segment, the mean of the intensities of points within the boundary of the cross-section contour generated at that centerline point;
8) Intensity standard deviation inside cross-section circular boundary—for each centerline point of the branch segment, the standard deviation of the intensities of points within the boundary of the cross-section contour generated at that centerline point;
9) Gradient mean along cross-section circular boundary—for each centerline point of the branch segment, the mean of the image gradient values at points on the boundary of the cross-section contour generated at that centerline point;
10) Gradient standard deviation along cross-section circular boundary—for each centerline point of the branch segment, the standard deviation of the image gradient values at points on the boundary of the cross-section contour generated at that centerline point;
11) Gradient mean inside cross-section circular boundary—for each centerline point of the branch segment, the mean of the image gradient values at points within the boundary of the cross-section contour generated at that centerline point;
12) Gradient standard deviation inside cross-section circular boundary—for each centerline point of the branch segment, the standard deviation of the image gradient values at points within the boundary of the cross-section contour generated at that centerline point; and
13) Distance to the most proximal point in the branch—for each centerline point of the branch segment, the distance from that point to the most proximal point in the branch of the detected centerline tree. For example, for coronary arteries the most proximal point in the branch corresponds to the ostium point.

At step 410, a probability score is calculated for each branch segment based on the 1D profiles using a trained deep neural network classifier. For each of the overlapping fixed length branch segments, the 1D profiles extracted for that branch segment are input directly to the trained deep neural network classifier as multi-channel 1D input, and the trained deep neural network calculates a probability score for that branch segment. The trained deep neural network is trained to assign high probabilities to branch segments that fully overlap with ground truth target vessel structures and low probabilities to branch segments that partially overlap or do not overlap at all with ground truth target vessel structures. When applied to classify branch segments of a centerline tree detected in a medical image, trained deep neural network calculates a probability score that represents a probability that the branch segment is fully part of the vessel of interest (e.g., coronary artery). In an advantageous embodiment, trained deep neural network is a convolutional neural network (CNN). An example of a structure of such a CNN is illustrated in FIG. 3 and described above. The CNN is trained based on annotated training datasets, as described above.

At step 412, a final probability score is assigned to each centerline point in the detected vessel centerline tree based on the probability scores of the branch segments containing that centerline point. Since the fixed length branch segments sampled from the detected vessel centerline tree overlap with one another, a given centerline point in the detected vessel centerline tree may be included in multiple overlapping branch segments. A probability score for each of the overlapping branch segments is calculated using the trained deep neural network classifier. In an advantageous embodiment, for a given centerline point in the detected vessel centerline tree, the maximum probability score is determined among all of the branch segments containing that centerline point and that maximum probability score is assigned as the final probability score for that centerline point. That is, the final probability score assigned to each centerline point in the detected vessel centerline tree is the maximum probability score calculated by the trained deep neural network among all of the overlapping fixed length branch segments containing that centerline point. Since the trained deep neural network calculates a probability that a branch segment is fully part of the target vessel, the maximum probability among all of the branch segments containing a particular centerline point also provides a probability that the particular centerline point is part of the target vessel. For example, if a centerline point is part of a branch segment with a high probability of being fully in the target vessel structure, then that centerline point has a high probability of being in the target vessel structure, even if that centerline point is also part of one or more branch segments that have low probabilities of being fully in the vessel structure. In an alternative embodiment, the final probability score for a given centerline point in the detected vessel centerline tree can be calculated as the average of the probability scores of the branch segments containing that centerline point.

At step 414, branches of the detected vessel centerline tree are pruned based on the final probability scores of the centerline points in the detected vessel centerline tree. One way of obtaining the final centerline tree is to prune downstream of points that have final probability scores below a threshold value. However, this approach is sensitive to single points that are misclassified. Instead, in an advantageous embodiment of the present invention, each branch is pruned independently by considering each branch from proximal (ostia) to distal points to find a point at which to prune each branch and then the independently pruned branches are merged to obtain the final vessel centerline tree. In a possible implementation, in order to handle misclassified single centerline points, each centerline point of a branch may be classified as vessel or non-vessel based on simple statistics (e.g., average or median) of the final probability scores within a predetermine sized neighborhood of that point.

Various methods can be used to determine where to prune each branch according to various embodiments of the present invention. In a first embodiment, a vessel branch is pruned at the first non-vessel point proximally. That is, starting with the most proximal point of the vessel branch, each centerline point is classified as vessel or non-vessel based on the final probability scores, and the vessel branch is pruned by removing the first centerline point classified as non-vessel and all centerline points distal to that point. This embodiment may have a drawback of pruning true branches in the presence of a severe occlusion. In a second embodiment, the branch is pruned at the first vessel point distally. That is, starting with the most distal point of the vessel branch, each centerline point is classified as vessel or non-vessel based on the final probability scores, and the vessel branch is pruned all centerline points until the first centerline point classified as vessel is reached. However, this approach may not accurately prune branches that leak into coronary veins that look similar to coronary arteries. In a third embodiment, a pruning point is found for a vessel branch that minimizes a total error made by pruning the branch. This embodiment is advantageous in that is more robust in the presence of occlusions or coronary veins. In this embodiment, each centerline point in the detected vessel branch is classified as vessel or non-vessel based on the final probability scores, and for each centerline point in the detected vessel branch, an error value is computed by summing a count of upstream points (i.e., in a proximal direction) classified as non-vessel and a count of downstream points (i.e., in a distal direction) classified as vessel. The centerline point with the smallest error value is selected as the pruning point, and all centerline points distal to the pruning point are removed.

Figure 5:
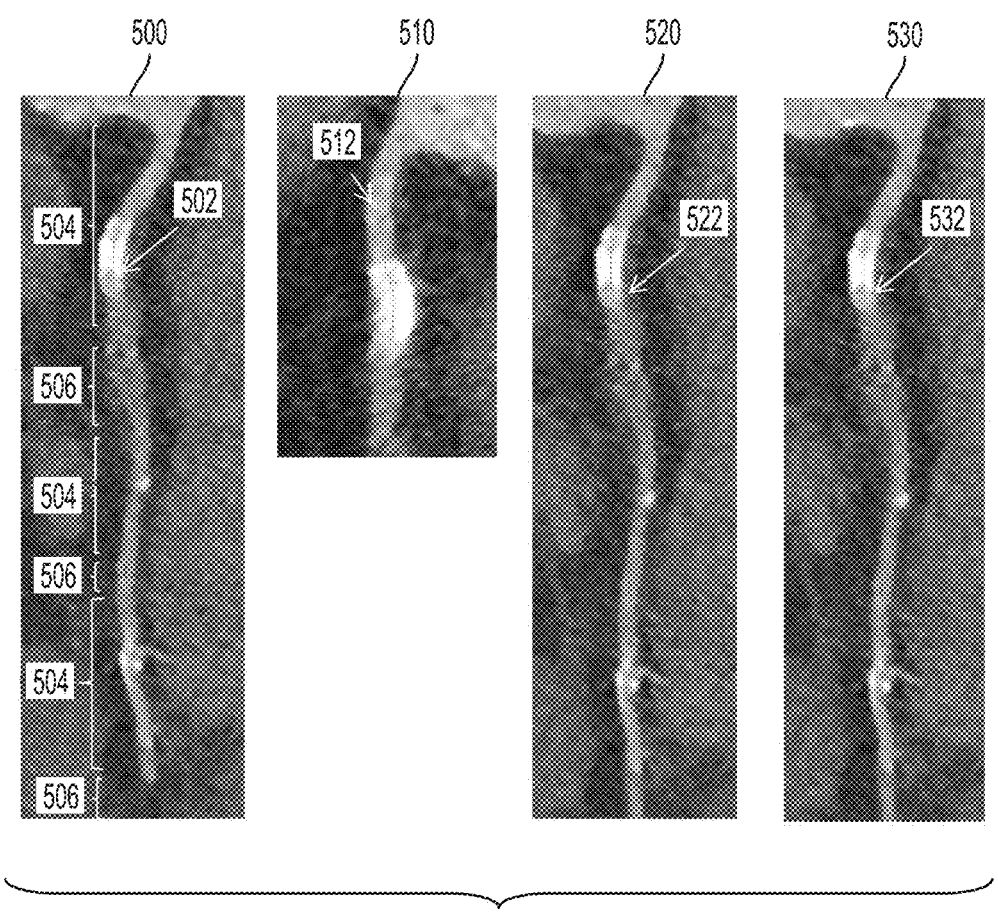
FIG. 5 illustrates examples of pruning a detected centerline of a branch of a coronary artery according various embodiments of the present invention.

FIG. 5 illustrates examples of pruning a detected centerline of a branch of a coronary artery according various embodiments of the present invention. Image 500 of FIG. 5 shows an example of a detected centerline 502 for a right coronary artery (RCA) main branch overlaid on a curved MPR view. As shown in image 500 centerline points 504 are classified as vessel and centerline points 506 are classified as non-vessel centerline points. Images 510, 520, and 530 show exemplary results of pruning the detected centerline 502 in image 500 using the first, second, and third embodiments described above. Image 510 of FIG. 5 shows a pruned centerline 512 resulting from pruning the detected centerline 502 at the first centerline point classified as non-vessel proximally, according to the first embodiment. Image 520 of FIG. 5 shows a pruned centerline 522 resulting from pruning the detected centerline 502 at the first centerline point classified as vessel distally, according to the second embodiment. Image 530 of FIG. 5 shows a pruned centerline 532 resulting from pruning the detected centerline 502 at a pruning point selected to minimize total pruning error, according to the third embodiment.

In another possible embodiment, it is also possible to train a machine-learning based classifier that can predict the pruning point for each detected vessel branch using features extracted from the predicted final probability scores of the centerline points and also geometric attributed of the branch, such as curvature, bifurcating angle, position relative to heart anatomy, etc.

The trained deep neural network (e.g., CNN) classifier may predict low probability scores for occluded branches due to severe pathologies or imaging artifacts, such as motion. This may result in pruning main branches proximally and therefore missing clinically important branches, as well as their downstream tree. In an advantageous embodiment for coronary artery classification, in order to make the pruning step robust to such occlusions, pruning may not be performed along the detected main branches (RCA, LAD, and LCX), and is instead performed on branches downstream of the main branches.

Returning to FIG. 4, at step 416, the pruned vessel centerline tree is output. The final pruned centerline tree of the vessel of interest can be output by displaying the pruned centerline tree on a display device of a computer system. In addition, the vessel of interest can be segmented along the final pruned centerline tree, and the segmented vessel of interest can be displayed on a display device.

Figure 6:
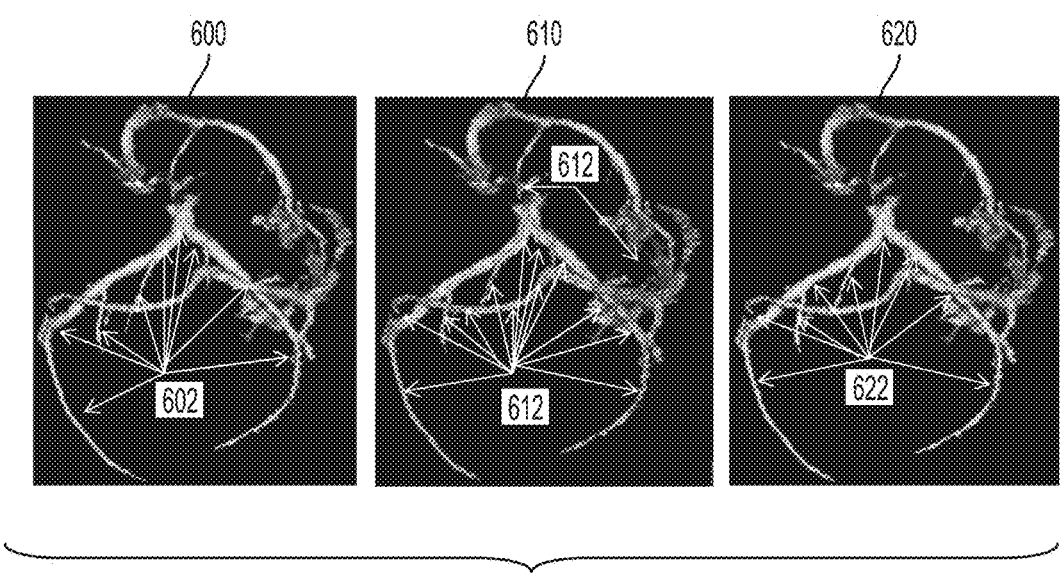
FIG. 6 illustrates exemplary results of the method of FIG. 4.

FIG. 6 illustrates exemplary results of the method of FIG. 4. As shown in FIG. 6, image 600 shows ground truth expert annotated coronary artery centerlines 602 overlaid on a VRT rendering of a vesselness mask detected in a 3D coronary CTA image. Image 610 shows detected coronary artery centerlines 612 extracted from the 3D CTA image using an automated centerline extraction method. Image 620 shows the final detected coronary artery centerlines 622 after pruning is performed using the method of FIG. 4. It can be observed from the final pruned detected coronary artery centerline 622 in image 620 that the pruning removed falsely detected coronary artery centerlines from the detected coronary artery centerline 612 in image 610.

Figure 7:
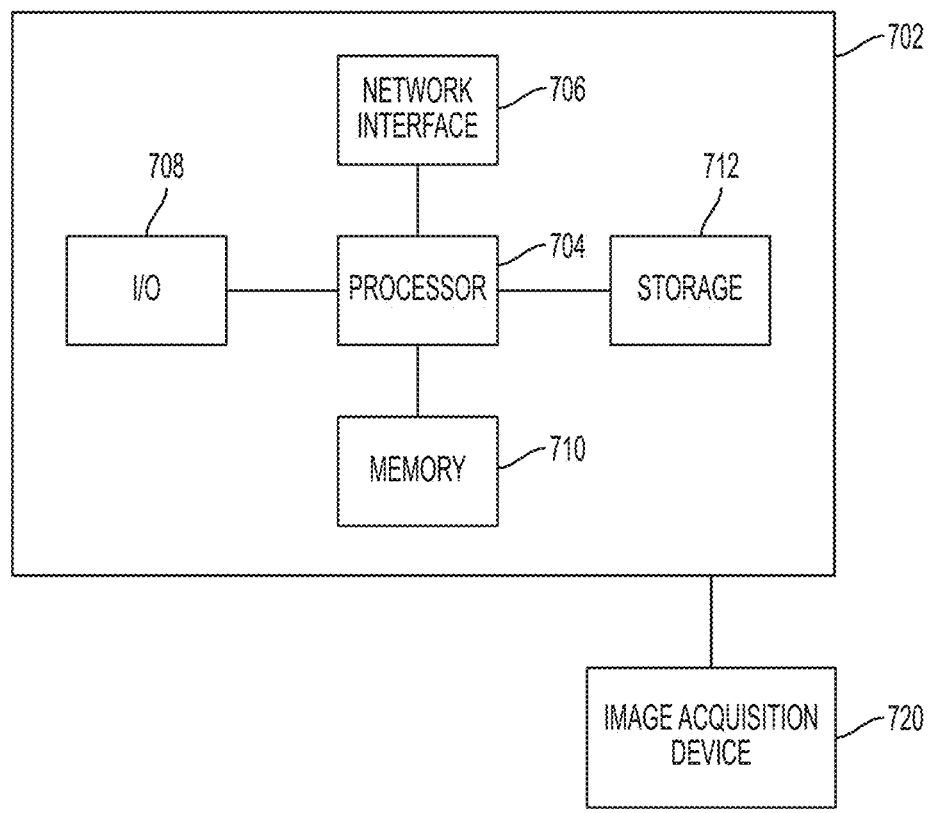
FIG. 7 is a high-level block diagram of a computer capable of implementing the present invention.

The above-described methods for vascular centerline detection and machine learning based classification of vascular branches to distinguish falsely detected branches from true branches may be implemented on a computer using well-known computer processors, memory units, storage devices, computer software, and other components. A high-level block diagram of such a computer is illustrated in FIG. 7. Computer 702 contains a processor 704, which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the method of FIG. 4 may be defined by the computer program instructions stored in the memory 710 and/or storage 712 and controlled by the processor 704 executing the computer program instructions. An image acquisition device 720, such as a CT scanner, can be connected to the computer 702 to input image data to the computer 702. It is possible to implement the image acquisition device 720 and the computer 702 as one device. It is also possible that the image acquisition device 720 and the computer 702 communicate wirelessly through a network. In a possible embodiment, the computer 702 can be located remotely with respect to the image acquisition device 720 and the method steps described herein can be performed as part of a server or cloud based service. In this case, the method steps may be performed on a single computer or distributed between multiple networked computers. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.). Such input/output devices 708 may be used in conjunction with a set of computer programs as an annotation tool to annotate volumes received from the image acquisition device 720. One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for machine learning based classification of vascular branches to distinguish falsely detected branches from true branches, comprising:
    sampling a plurality of overlapping fixed size branch segments from one or more branches of a detected centerline tree of a target vessel extracted from a medical image of a patient;
    extracting a plurality of 1D profiles along each of the plurality of overlapping fixed size branch segments;
    calculating a probability score for each of the plurality of overlapping fixed size branch segments based on the plurality of 1D profiles using a trained deep neural network classifier;
    assigning a final probability score to each of a plurality of centerline points in the one or more branches of the detected centerline tree of the target vessel based on the probability scores of the overlapping fixed size branch segments containing that centerline point; and
    pruning the one or more branches of the detected centerline tree of the target vessel based on the final probability scores of the plurality of centerline points in the one or more branches of the detected centerline tree of the target vessel to remove falsely detected branches from true branches in the one or more branches of the detected centerline tree of the target vessel.

2. The method of claim 1, wherein each 1D profile of the plurality of 1D profiles is a vector of values of a respective measurement extracted from the medical image, and extracting a plurality of 1D profiles along each of the plurality of overlapping fixed size branch segments comprises:
    for each of the plurality of overlapping fixed size branch segments, calculating a value of the respective measurement for each of the plurality of 1D profiles at each of centerline point of the overlapping fixed size branch segment.

3. The method of claim 1, wherein extracting a plurality of 1D profiles along each of the plurality of overlapping fixed size branch segments comprises:
    extracting, for each of the plurality of overlapping fixed length branch segments, 1D profiles of vessel scale, image intensity, centerline curvature, tubularity measure, image intensity and gradient statistics along and inside a cross-sectional circular boundary, and distance to a most proximal point in the branch of the detected centerline tree.

4. The method of claim 3, wherein extracting, for each of the plurality of overlapping fixed length branch segments, 1D profiles of vessel scale, image intensity, centerline curvature, tubularity measure, image intensity and gradient statistics along and inside a cross-sectional circular boundary, and distance to a most proximal point in the branch of the detected centerline tree comprises:
    for each of the plurality of overlapping fixed length branch segments, extracting, from the medical image, a respective value at each centerline point of the overlapping fixed length branch segment for each of the vessel scale, the image intensity, the centerline curvature, the tubularity measure, an intensity mean along a cross-section circular boundary, an intensity standard deviation along the cross-section circular boundary, an intensity mean inside the cross-section circular boundary, an intensity standard deviation inside the cross-section circular boundary, a gradient mean along the cross-section circular boundary, a gradient standard deviation along the cross-section circular boundary, a gradient mean inside the cross-section circular boundary, a gradient standard deviation inside the cross-sectional circular boundary, and the distance to the most proximal point in the branch of the detected centerline tree.

5. The method of claim 1, wherein the probability score calculated for each of the plurality of overlapping fixed size branch segments using the trained deep neural network classifier represents a probability that the overlapping fixed size branch segment is fully part of the target vessel.

6. The method of claim 1, wherein the trained deep neural network is a trained convolutional neural network (CNN) that inputs the plurality of 1D profiles extracted for each of the plurality of overlapping fixed length branch segments as a multi-channel 1D input, and outputs the probability score for the each of the plurality of overlapping fixed length branch segments representing a probability that the overlapping fixed length branch segment is fully part of the target vessel.

7. The method of claim 1, wherein assigning a final probability score to each of a plurality of centerline points in the one or more branches of the detected centerline tree of the target vessel based on the probability scores of the overlapping fixed size branch segments containing that centerline point comprises:
    for each of the plurality of centerline points in the one or more branches of the detected centerline tree of the target vessel:
        determining a maximum probability score among the probability scores of the overlapping fixed size branch segments containing that centerline point, and
        assigning the maximum probability score among the probability scores of the overlapping fixed size branch segments containing that centerline point as the final probability score of the centerline point.

8. The method of claim 1, wherein pruning the one or more branches of the detected centerline tree of the target vessel based on the final probability scores of the plurality of centerline points in the one or more branches of the detected centerline tree of the target vessel comprises:
    classifying each of the plurality of centerline points in the one or more branches of the detected centerline tree of the target vessel as a vessel point or a non-vessel point based on the final probability scores of the plurality of centerline points; and
    pruning the one or more branches of the detected centerline tree of the target vessel based on the classification of each of the plurality of centerline points as a vessel point or a non-vessel point.

9. The method of claim 8, wherein classifying each of the plurality of centerline points in the one or more branches of the detected centerline tree of the target vessel as a vessel point or a non-vessel point based on the final probability scores of the plurality of centerline points comprises:
    for each of the plurality of centerline points, classifying the centerline point as a vessel point or a non-vessel point based on an average or median of the final probability scores of centerline points within a predetermined size neighborhood of the centerline point.

10. The method of claim 8, wherein pruning the one or more branches of the detected centerline tree of the target vessel based on the classification of each of the plurality of centerline points as a vessel point or a non-vessel point comprises:
    for each branch of the one or more branches of the detected centerline:
        calculating an error value for each centerline point in the branch by summing a number of centerline points upstream of that centerline point that are classified as non-vessel points and a number of centerline points downstream of that centerline point that are classified as vessel points,
        selecting a centerline point with a smallest error value as a pruning point, and
        pruning the branch by removing all centerline points downstream of the pruning point.

11. The method of claim 8, wherein pruning the one or more branches of the detected centerline tree of the target vessel based on the classification of each of the plurality of centerline points as a vessel point or a non-vessel point comprises:
    for each branch of the one or more branches of the detected centerline, starting from a most proximal centerline point in the branch, pruning the branch at a first centerline point classified as a non-vessel point.

12. The method of claim 8, wherein pruning the one or more branches of the detected centerline tree of the target vessel based on the classification of each of the plurality of centerline points as a vessel point or a non-vessel point comprises:
    for each branch of the one or more branches of the detected centerline, starting from a most distal centerline point in the branch, pruning the branch at a first centerline point classified as a vessel point.

13. The method of claim 1, wherein pruning the one or more branches of the detected centerline tree of the target vessel based on the final probability scores of the plurality of centerline points in the one or more branches of the detected centerline tree of the target vessel comprises:
    for each branch of the one or more branches of the detected centerline:
        predicting a pruning point using a trained machine learning based classifier based on the final probability scores of the centerline points in the branch and geometric attributes of the branch, and
        pruning the branch by removing all centerline points downstream of the pruning point.

14. An apparatus for machine learning based classification of vascular branches to distinguish falsely detected branches from true branches, comprising:
    means for sampling a plurality of overlapping fixed size branch segments from one or more branches of a detected centerline tree of a target vessel extracted from a medical image of a patient;
    means for extracting a plurality of 1D profiles along each of the plurality of overlapping fixed size branch segments;
    means for calculating a probability score for each of the plurality of overlapping fixed size branch segments based on the plurality of 1D profiles using a trained deep neural network classifier;
    means for assigning a final probability score to each of a plurality of centerline points in the one or more branches of the detected centerline tree of the target vessel based on the probability scores of the overlapping fixed size branch segments containing that centerline point; and means for pruning the one or more branches of the detected centerline tree of the target vessel based on the final probability scores of the plurality of centerline points in the one or more branches of the detected centerline tree of the target vessel to remove falsely detected branches from true branches in the one or more branches of the detected centerline tree of the target vessel.

15. The apparatus of claim 14, wherein the plurality of 1D profiles include 1D profiles of vessel scale, image intensity, centerline curvature, tubularity measure, image intensity and gradient statistics along and inside a cross-sectional circular boundary, and distance to a most proximal point in the branch of the detected centerline tree.

16. The apparatus of claim 14, wherein the probability score calculated for each of the plurality of overlapping fixed size branch segments using the trained deep neural network classifier represents a probability that the overlapping fixed size branch segment is fully part of the target vessel.

17. The apparatus of claim 14, wherein the trained deep neural network is a trained convolutional neural network (CNN) that inputs the plurality of 1D profiles extracted for each of the plurality of overlapping fixed length branch segments as a multi-channel 1D input, and outputs the probability score for the each of the plurality of overlapping fixed length branch segments representing a probability that the overlapping fixed length branch segment is fully part of the target vessel.

18. The apparatus of claim 14, wherein the final probability score assigned to each of the plurality of centerline points in the one or more branches of the detected centerline tree of the target vessel is a maximum probability score among the probability scores of the overlapping fixed size branch segments containing that centerline point.

19. The apparatus of claim 14, wherein the means for pruning the one or more branches of the detected centerline tree of the target vessel based on the final probability scores of the plurality of centerline points in the one or more branches of the detected centerline tree of the target vessel comprises:

means for classifying each of the plurality of centerline points in the one or more branches of the detected centerline tree of the target vessel as a vessel point or a non-vessel point based on the final probability scores of the plurality of centerline points; and means for pruning the one or more branches of the detected centerline tree of the target vessel based on the classification of each of the plurality of centerline points as a vessel point or a non-vessel point.

20. The apparatus of claim 19, wherein the means for pruning the one or more branches of the detected centerline tree of the target vessel based on the classification of each of the plurality of centerline points as a vessel point or a non-vessel point comprises:

means for calculating an error value for each centerline point in a branch of the one or more branches of the detected centerline tree; and means for pruning the branch at a centerline point having a smallest error value.

21. A non-transitory computer readable medium storing computer program instructions for machine learning based classification of vascular branches to distinguish falsely detected branches from true branches, the computer program instructions when executed by a processor cause the processor to perform operations comprising:

sampling a plurality of overlapping fixed size branch segments from one or more branches of a detected centerline tree of a target vessel extracted from a medical image of a patient;

extracting a plurality of 1D profiles along each of the plurality of overlapping fixed size branch segments;

calculating a probability score for each of the plurality of overlapping fixed size branch segments based on the plurality of 1D profiles using a trained deep neural network classifier;

assigning a final probability score to each of a plurality of centerline points in the one or more branches of the detected centerline tree of the target vessel based on the probability scores of the overlapping fixed size branch segments containing that centerline point; and pruning the one or more branches of the detected centerline tree of the target vessel based on the final probability scores of the plurality of centerline points in the one or more branches of the detected centerline tree of the target vessel to remove falsely detected branches from true branches in the one or more branches of the detected centerline tree of the target vessel.

22. The non-transitory computer readable medium of claim 21, wherein each 1D profile of the plurality of 1D profiles is a vector of values of a respective measurement extracted from the medical image, and extracting a plurality of 1D profiles along each of the plurality of overlapping fixed size branch segments comprises:

for each of the plurality of overlapping fixed size branch segments, calculating a value of the respective measurement for each of the plurality of 1D profiles at each of centerline point of the overlapping fixed size branch segment.

23. The non-transitory computer readable medium of claim 21, wherein extracting a plurality of 1D profiles along each of the plurality of overlapping fixed size branch segments comprises:

extracting, for each of the plurality of overlapping fixed length branch segments, 1D profiles of vessel scale, image intensity, centerline curvature, tubularity measure, image intensity and gradient statistics along and inside a cross-sectional circular boundary, and distance to a most proximal point in the branch of the detected centerline tree.

24. The non-transitory computer readable medium of claim 21, wherein the probability score calculated for each of the plurality of overlapping fixed size branch segments using the trained deep neural network classifier represents a probability that the overlapping fixed size branch segment is fully part of the target vessel.

25. The non-transitory computer readable medium of claim 21, wherein the trained deep neural network is a trained convolutional neural network (CNN) that inputs the plurality of 1D profiles extracted for each of the plurality of overlapping fixed length branch segments as a multi-channel 1D input, and outputs the probability score for the each of the plurality of overlapping fixed length branch segments representing a probability that the overlapping fixed length branch segment is fully part of the target vessel.

26. The non-transitory computer readable medium of claim 21, wherein assigning a final probability score to each of a plurality of centerline points in the one or more branches of the detected centerline tree of the target vessel based on the probability scores of the overlapping fixed size branch segments containing that centerline point comprises:
for each of the plurality of centerline points in the one or more branches of the detected centerline tree of the target vessel:
determining a maximum probability score among the probability scores of the overlapping fixed size branch segments containing that centerline point, and
assigning the maximum probability score among the probability scores of the overlapping fixed size branch segments containing that centerline point as the final probability score of the centerline point.

27. The non-transitory computer readable medium of claim 21, wherein pruning the one or more branches of the detected centerline tree of the target vessel based on the final probability scores of the plurality of centerline points in the one or more branches of the detected centerline tree of the target vessel comprises:
classifying each of the plurality of centerline points in the one or more branches of the detected centerline tree of the target vessel as a vessel point or a non-vessel point based on the final probability scores of the plurality of centerline points; and
pruning the one or more branches of the detected centerline tree of the target vessel based on the classification of each of the plurality of centerline points as a vessel point or a non-vessel point.

28. The non-transitory computer readable medium of claim 27, wherein classifying each of the plurality of centerline points in the one or more branches of the detected centerline tree of the target vessel as a vessel point or a non-vessel point based on the final probability scores of the plurality of centerline points comprises:
for each of the plurality of centerline points, classifying the centerline point as a vessel point or a non-vessel point based on an average or median of the final probability scores of centerline points within a predetermined size neighborhood of the centerline point.

29. The non-transitory computer readable medium of claim 27, wherein pruning the one or more branches of the detected centerline tree of the target vessel based on the classification of each of the plurality of centerline points as a vessel point or a non-vessel point comprises:
for each branch of the one or more branches of the detected centerline:
calculating an error value for each centerline point in the branch by summing a number of centerline points upstream of that centerline point that are classified as non-vessel points and a number of centerline points downstream of that centerline point that are classified as vessel points,
selecting a centerline point with a smallest error value as a pruning point, and
pruning the branch by removing all centerline points downstream of the pruning point.

30. The non-transitory computer readable medium of claim 27, wherein pruning the one or more branches of the detected centerline tree of the target vessel based on the classification of each of the plurality of centerline points as a vessel point or a non-vessel point comprises:
for each branch of the one or more branches of the detected centerline, starting from a most proximal centerline point in the branch, pruning the branch at a first centerline point classified as a non-vessel point.

31. The non-transitory computer readable medium of claim 27, wherein pruning the one or more branches of the detected centerline tree of the target vessel based on the classification of each of the plurality of centerline points as a vessel point or a non-vessel point comprises:
for each branch of the one or more branches of the detected centerline, starting from a most distal centerline point in the branch, pruning the branch at a first centerline point classified as a vessel point.

32. The non-transitory computer readable medium of claim 21, wherein pruning the one or more branches of the detected centerline tree of the target vessel based on the final probability scores of the plurality of centerline points in the one or more branches of the detected centerline tree of the target vessel comprises:
for each branch of the one or more branches of the detected centerline:
predicting a pruning point using a trained machine learning based classifier based on the final probability scores of the centerline points in the branch and geometric attributes of the branch, and
pruning the branch by removing all centerline points downstream of the pruning point.

* * * * *